(12) United States Patent
Lawless

(10) Patent No.: US 6,290,757 B1
(45) Date of Patent: Sep. 18, 2001

(54) NITROGEN PURIFICATION DEVICE

(75) Inventor: William N. Lawless, Westerville, OH (US)

(73) Assignee: CeramPhysics, Inc., Wsterville, OH (US)

(*) Notice: Subject to any disclaimer, the term of this patent is extended or adjusted under 35 U.S.C. 154(b) by 0 days.

(21) Appl. No.: 09/533,334

(22) Filed: Mar. 23, 2000

Related U.S. Application Data

(60) Provisional application No. 60/126,485, filed on Mar. 26, 1999.

(51) Int. Cl.[7] ............................................. B03C 3/68
(52) U.S. Cl. .......................... 96/19; 55/523; 55/DIG. 38; 96/69; 96/70; 96/73; 96/100; 204/290 R
(58) Field of Search .................... 96/4, 7, 8, 10, 96/11, 18, 19, 69, 70, 73, 100; 95/3, 47, 8, 54, 57, 59; 55/523, 524, DIG. 38; 204/270, 290 R

(56) References Cited

U.S. PATENT DOCUMENTS

| | | |
|---|---|---|
| 3,400,054 | 9/1968 | Ruka et al. . |
| 3,793,802 * | 2/1974 | Hardt ........................... 55/DIG. 38 |
| 4,155,792 * | 5/1979 | Gelhaar et al. ..................... 96/100 X |
| 4,195,119 | 3/1980 | Kummer . |
| 4,231,231 | 11/1980 | Lawless . |
| 4,296,147 | 10/1981 | Lawless . |
| 4,296,607 | 10/1981 | Lawless . |
| 4,296,608 | 10/1981 | Lawless . |

(List continued on next page.)

FOREIGN PATENT DOCUMENTS

| | | |
|---|---|---|
| 0 726 226 A1 | 8/1996 | (EP) . |
| 0 778 069 A1 | 6/1997 | (EP) . |
| WO 95/08360 | 3/1995 | (WO) . |

OTHER PUBLICATIONS

Solid State Fuel Cells, "Characterization and development of a new ceramic electrolyte for fuel cell applications." No. XP–002120860, 1991, USA.

*Primary Examiner*—Richard L. Chiesa
(74) *Attorney, Agent, or Firm*—Killworth, Gotiman, Hagan & Schaeff LLP

(57) ABSTRACT

A ceramic honeycomb nitrogen purification device is provided including a source gas, a set of gaseous nitrogen passages, a set of oxygen disposal passages, an electroded oxygen conducting ceramic membrane, an electrical power source, an oxygen sensor, and nitrogen purification control circuitry. The source gas includes gaseous nitrogen. The set of gaseous nitrogen passages defines respective source nitrogen input openings and purified nitrogen output openings. The set of oxygen disposal passages defines disposed oxygen output openings, wherein a plurality of the gaseous nitrogen passages are exclusively dedicated to individual ones of the oxygen disposal passages. The electroded oxygen conducting ceramic membrane includes a ceramic body defining the set of gaseous nitrogen passages and the set of oxygen disposal passages in the form of first and second sets of substantially parallel passages and including a plurality of electrode surfaces disposed in the gaseous nitrogen passages and the oxygen disposal passages, the oxygen disposal passages being separated from respective ones of the set of gaseous nitrogen passages by the electroded surfaces of the oxygen conducting ceramic membrane. The electrical power source is coupled to the electroded oxygen conducting ceramic membrane and arranged such that the electroded surfaces comprise cathodes in the gaseous nitrogen passages and anodes in the oxygen disposal passages. The oxygen sensor is in fluid communication with the purified nitrogen output openings. The nitrogen purification control circuitry is arranged to optimize current and voltage generated by the power source by switching from a current control mode to a voltage control mode when the oxygen sensor signal indicates a decrease in oxygen content of gas passing through the purified nitrogen output openings below a predetermined level.

27 Claims, 6 Drawing Sheets

U.S. PATENT DOCUMENTS

| | | |
|---|---|---|
| 4,354,355 | 10/1982 | Lawless . |
| 4,356,235 | 10/1982 | Lawless . |
| 4,396,721 | 8/1983 | Lawless . |
| 4,449,990 | 5/1984 | Tedford, Jr. . |
| 4,462,891 | 7/1984 | Lawless . |
| 4,515,534 | 5/1985 | Lawless et al. . |
| 4,545,254 | 10/1985 | Lawless et al. . |
| 4,547,277 | 10/1985 | Lawless . |
| 4,599,677 | 7/1986 | Lawless et al. . |
| 4,684,207 | 8/1987 | Lawless . |
| 4,789,388 | 12/1988 | Nishibata et al. . |
| 4,885,142 | 12/1989 | Suitor et al. . |
| 4,918,421 | 4/1990 | Lawless et al. . |
| 5,009,763 | 4/1991 | Hise . |
| 5,034,023 | 7/1991 | Thompson . |
| 5,062,911 | 11/1991 | Hampton et al. . |
| 5,108,465 | 4/1992 | Bauer et al. . |
| 5,169,506 | 12/1992 | Michaels . |
| 5,183,965 | 2/1993 | Lawless . |
| 5,186,793 | 2/1993 | Michaels . |
| 5,200,154 * | 4/1993 | Harada et al. ............... 55/523 X |
| 5,205,990 | 4/1993 | Lawless . |
| 5,212,013 | 5/1993 | Gupta et al. . |
| 5,222,713 | 6/1993 | Lawless et al. . |
| 5,246,729 | 9/1993 | Gupta et al. . |
| 5,296,110 | 3/1994 | Tabatabaie-Raissi . |
| 5,302,258 | 4/1994 | Renlund et al. . |
| 5,318,755 * | 6/1994 | Kuivaloainen et al. ........... 55/523 X |
| 5,385,874 | 1/1995 | Renlund et al. . |
| 5,397,443 | 3/1995 | Michaels . |
| 5,441,610 | 8/1995 | Renlund et al. . |
| 5,536,378 | 7/1996 | Gibson et al. . |
| 5,549,983 | 8/1996 | Yamanis . |
| 5,589,017 | 12/1996 | Minh . |
| 5,611,845 | 3/1997 | Delp, II . |
| 5,643,355 | 7/1997 | Phillips et al. . |
| 5,712,055 | 1/1998 | Khandkar et al. . |
| 5,731,097 | 3/1998 | Miyashita et al. . |
| 5,807,642 | 9/1998 | Xue et al. . |
| 5,855,762 | 1/1999 | Phillips et al. . |
| 5,865,877 | 2/1999 | Delp, II . |
| 5,905,000 | 5/1999 | Yadav et al. . |
| 5,922,111 * | 7/1999 | Omi et al. ..................... 96/100 X |
| 5,922,178 | 7/1999 | Isenberg . |
| 5,961,929 * | 10/1999 | Lawless .............. 55/523 X |
| 5,972,182 * | 10/1999 | Lawless .............. 204/270 X |
| 6,033,457 | 3/2000 | Lawless . |
| 6,077,436 * | 6/2000 | Rajnik et al. ................... 96/4 X |
| 6,101,793 * | 8/2000 | Nagai et al. ..................... 55/523 |

\* cited by examiner

NITROGEN PURIFICATION DEVICE

CROSS-REFERENCE TO RELATED APPLICATIONS

This application claims the benefit of U.S. Provisional Application Ser. No. 60/126,485, filed Mar. 26, 1999.

BACKGROUND OF THE INVENTION

The present invention relates to nitrogen purification and, more particularly, to a nitrogen purification device employing a honeycomb ceramic structure that purifies nitrogen by removing oxygen from a gaseous nitrogen source.

Purified nitrogen is utilized in a variety of modern applications. Three conventional supplies of nitrogen gas include liquid nitrogen dewars, gas cylinders of nitrogen, and a nitrogen supply generated by passing air through bundles of semi-permeable membranes. All three of these sources of purified nitrogen have disadvantages. Specifically, nitrogen source dewars and cylinders are typically vendor-based products that are subject to cost fluctuations, supply shortages, and shipping and handling difficulties. The membrane based generators suffer from low flow rates, relatively low purity levels, relatively high initial cost, and relatively high maintenance costs. Accordingly, there is a need for a nitrogen generation scheme that overcomes the above-noted shortcomings associated with conventional nitrogen sources.

BRIEF SUMMARY OF THE INVENTION

This need is met by the present invention wherein an improved nitrogen purification scheme is provided. In accordance with one embodiment of the present invention, a nitrogen purification device is provided comprising a source gas, a set of gaseous nitrogen passages, a set of oxygen disposal passages, an electroded oxygen conducting ceramic membrane, an electrical power source and nitrogen purification control circuitry. The source gas comprises gaseous nitrogen. The gaseous nitrogen passages define respective source nitrogen input openings and purified nitrogen output openings. The set of oxygen disposal passages defines disposed oxygen output openings. The electroded oxygen conducting ceramic membrane defines a plurality of electrode surfaces disposed in the gaseous nitrogen passages and the oxygen disposal passages, the oxygen disposal passages being separated from respective ones of the set of gaseous nitrogen passages by the electroded oxygen conducting ceramic membrane. The electrical power source is coupled to the electroded oxygen conducting ceramic membrane and arranged such that the electroded surfaces comprise cathodes in the gaseous nitrogen passages and anodes in the oxygen disposal passages. The nitrogen purification control circuitry is arranged to optimize current and voltage generated by the power source as a function of nitrogen purity of gas passing through the purified nitrogen output openings.

The nitrogen purification device may further comprise an oxygen sensor in fluid communication with the purified nitrogen output openings, and the control circuitry may be arranged to optimize current and voltage generated by the power source as a function of a signal generated by the oxygen sensor. The control circuitry may be arranged to optimize current and voltage generated by the power source by switching from a current control mode to a voltage control mode when the oxygen sensor signal indicates a decrease in oxygen content below a predetermined level. The predetermined level is preferably between about 1000 ppm and about 200 ppm.

The oxygen conducting ceramic membrane may comprise a ceramic body defining the set of gaseous nitrogen passages and the set of oxygen disposal passages may be in the form of first and second sets of substantially parallel passages. The nitrogen purification device may further comprise a mass flow regulator coupled to at least one set of the first and second sets of substantially parallel passages. And, the nitrogen purification control circuitry may be further arranged to control the mass flow regulator to optimize a mass flow ratio η of gasses moving through the first and second sets of substantially parallel passages, where η represents the following ratio:

$$\eta = \frac{R_1}{R_2}$$

where $R_1$ represents a flow rate of a nitrogen source gas in the set of gaseous nitrogen passages and $R_2$ represents a flow rate of disposed oxygen in the oxygen disposal passages. The mass flow regulator may be arranged to establish the mass flow ratio η between about 0.2 and 2.0. The mass flow regulator may comprise a draft fan coupled to the set of oxygen disposal passages.

The nitrogen purification device may further comprise turbulence inducing inserts arranged in the set of gaseous nitrogen passages. The nitrogen purification device may further comprise a source gas comprising air and/or a source gas comprising a gas with a nitrogen purity level of about 97%. A plurality of gaseous nitrogen passages are preferably exclusively dedicated to individual ones of the oxygen disposal passages. Additionally, the oxygen conducting ceramic membrane may comprise a ceramic body defining the set of gaseous nitrogen passages and the set of oxygen disposal passages in the form of first and second sets of substantially parallel passages. A selected set of the first and second sets of passages preferably include inter-passage channels formed in the ceramic body between adjacent ones of the selected set of passages. The inter-passage channels may be arranged proximate selected ones of the opposite passage ends. The selected set of passages and the inter-passage channels are arranged to define a flow path extending through the selected set of passages. The flow path reverses direction following passage through the inter-passage channels.

Each of the passages defines opposite passage ends. The opposite ends of the gaseous nitrogen passages may be open and the opposite ends of the oxygen disposal passages may be closed. The oxygen disposal passages may include inter-passage channels formed in the ceramic body between adjacent ones of the oxygen disposal passages. The source nitrogen input openings may be coupled to a source of air or a source of gas with a nitrogen purity level of about 97%. The nitrogen purification device may further comprise at least one disposed oxygen output port coupled to the oxygen disposal passages.

Each of the passages define opposite passage ends and the opposite ends of the oxygen disposal passages may be open while the opposite ends of the gaseous nitrogen passages are closed. The gaseous nitrogen passages may include inter-passage channels formed in the ceramic body between adjacent ones of the gaseous nitrogen passages.

The oxygen conducting ceramic membrane preferably comprises a ceramic body defining the set of gaseous nitrogen passages and the set of oxygen disposal passages in the form of first and second sets of substantially parallel passages. Each of the passages define opposite passage ends. The opposite ends of a selected set of the passages are preferably open and the opposite ends of a remaining set of the passages are preferably closed. The set of closed passages include inter-passage channels formed in the ceramic body between adjacent ones of the closed passages. The nitrogen purification device further comprises at least one closed passage input port coupled to the closed set of passages and at least one closed passage output port coupled to the set of closed passages. The closed passage input port, the closed passages, and the closed passage output port collectively define a closed passage flow path extending from the closed passage input port to the closed passage output port. The closed passage input port may be coupled to a source of gaseous nitrogen while the open passages are coupled to a source of air and the nitrogen purification device is arranged such that the closed passage output port passes purified nitrogen. The nitrogen purification device may further comprise a draft fan coupled to the open passages. The closed passage input port may be coupled to a source of air while the open passages are coupled to a source of gaseous nitrogen, and the nitrogen purification device is arranged such that the closed passage output port passes oxygen enriched air. The nitrogen purification device may further comprise a draft fan coupled to the closed passage output port.

In accordance with another embodiment of the present invention, a nitrogen purification device is provided comprising a source gas, a set of gaseous nitrogen passages, a set of oxygen disposal passages, an electroded oxygen conducting ceramic membrane, an electrical power source, an oxygen sensor, and nitrogen purification control circuitry. The source gas comprises gaseous nitrogen. The set of gaseous nitrogen passages defines respective source nitrogen input openings and purified nitrogen output openings. The set of oxygen disposal passages defines disposed oxygen output openings, wherein a plurality of the gaseous nitrogen passages are exclusively dedicated to individual ones of the oxygen disposal passages. The electroded oxygen conducting ceramic membrane comprises a ceramic body defining the set of gaseous nitrogen passages and the set of oxygen disposal passages in the form of first and second sets of substantially parallel passages and including a plurality of electrode surfaces disposed in the gaseous nitrogen passages and the oxygen disposal passages, the oxygen disposal passages being separated from respective ones of the set of gaseous nitrogen passages by the electroded surfaces of the oxygen conducting ceramic membrane. The electrical power source is coupled to the electroded oxygen conducting ceramic membrane and arranged such that the electroded surfaces comprise cathodes in the gaseous nitrogen passages and anodes in the oxygen disposal passages. The oxygen sensor is in fluid communication with the purified nitrogen output openings. The nitrogen purification control circuitry is arranged to optimize current and voltage generated by the power source by switching from a current control mode to a voltage control mode when the oxygen sensor signal indicates a decrease in oxygen content of gas passing through the purified nitrogen output openings below a predetermined level.

Accordingly, it is an object of the present invention to provide an economical and readily usable nitrogen purification scheme that provides an exceptionally pure, high volume stream of nitrogen. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
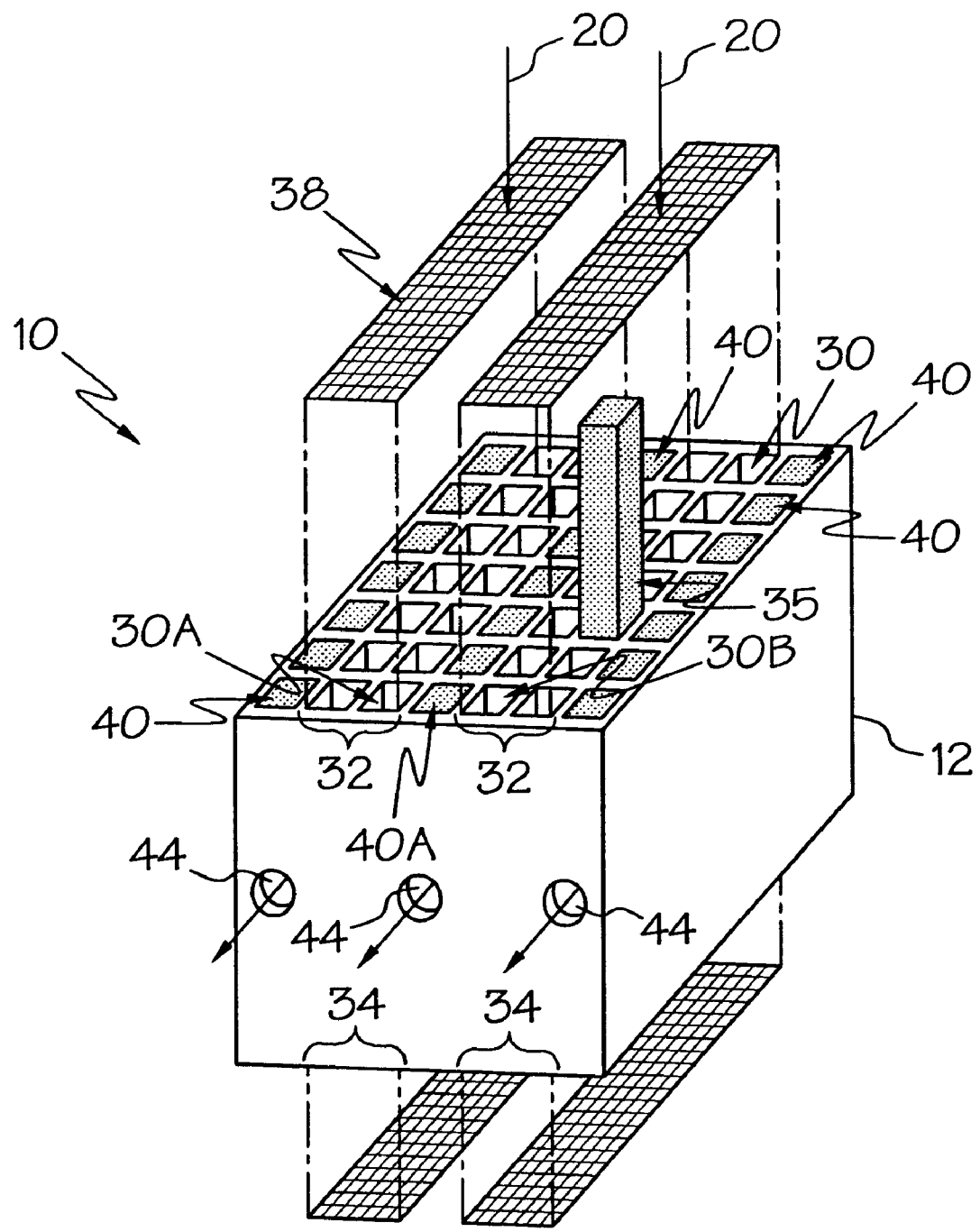
FIGS. 1 and 2 are schematic illustrations of a three stream nitrogen purification device according to the present invention.
Figure 2:
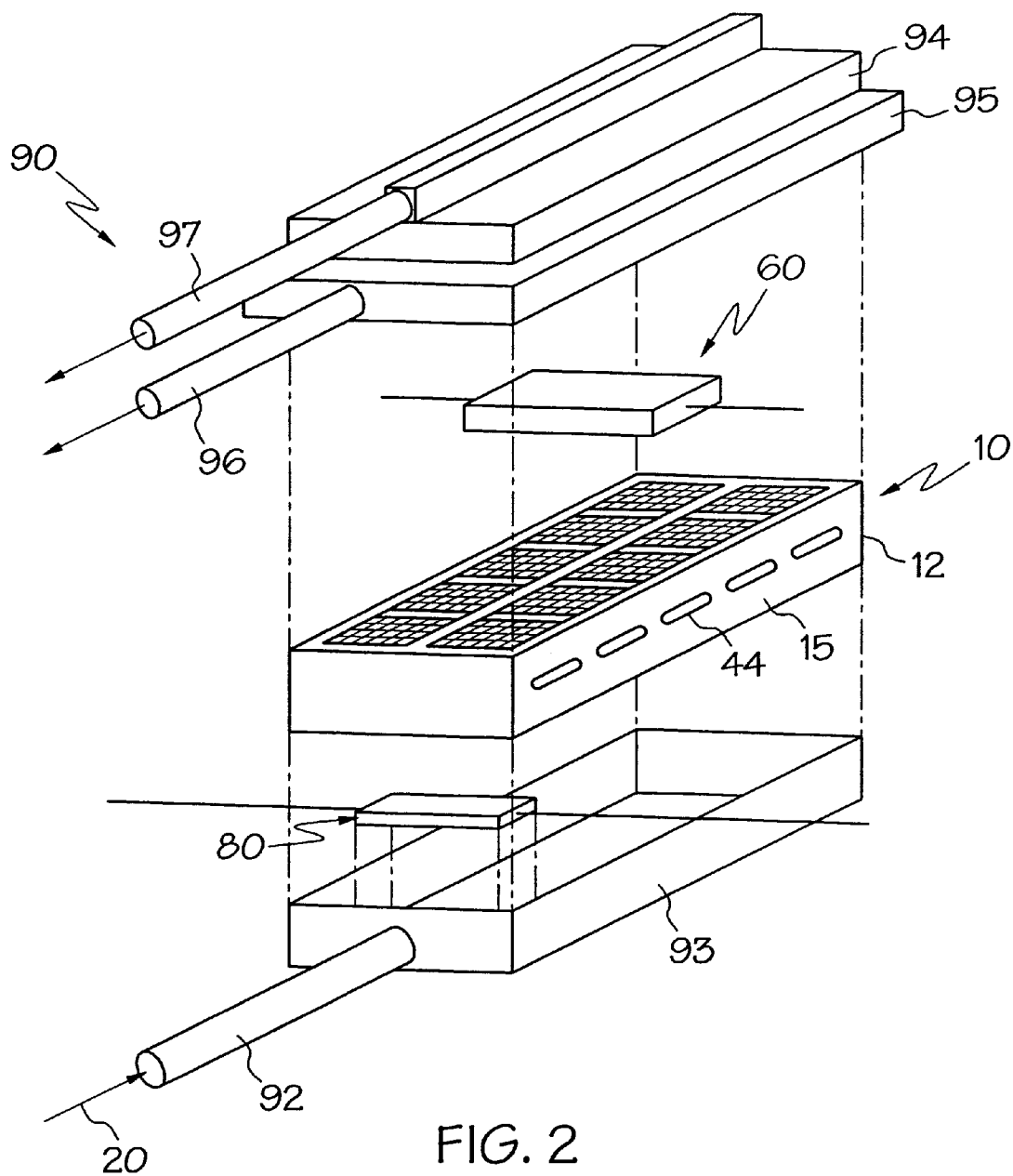
Figure 3:
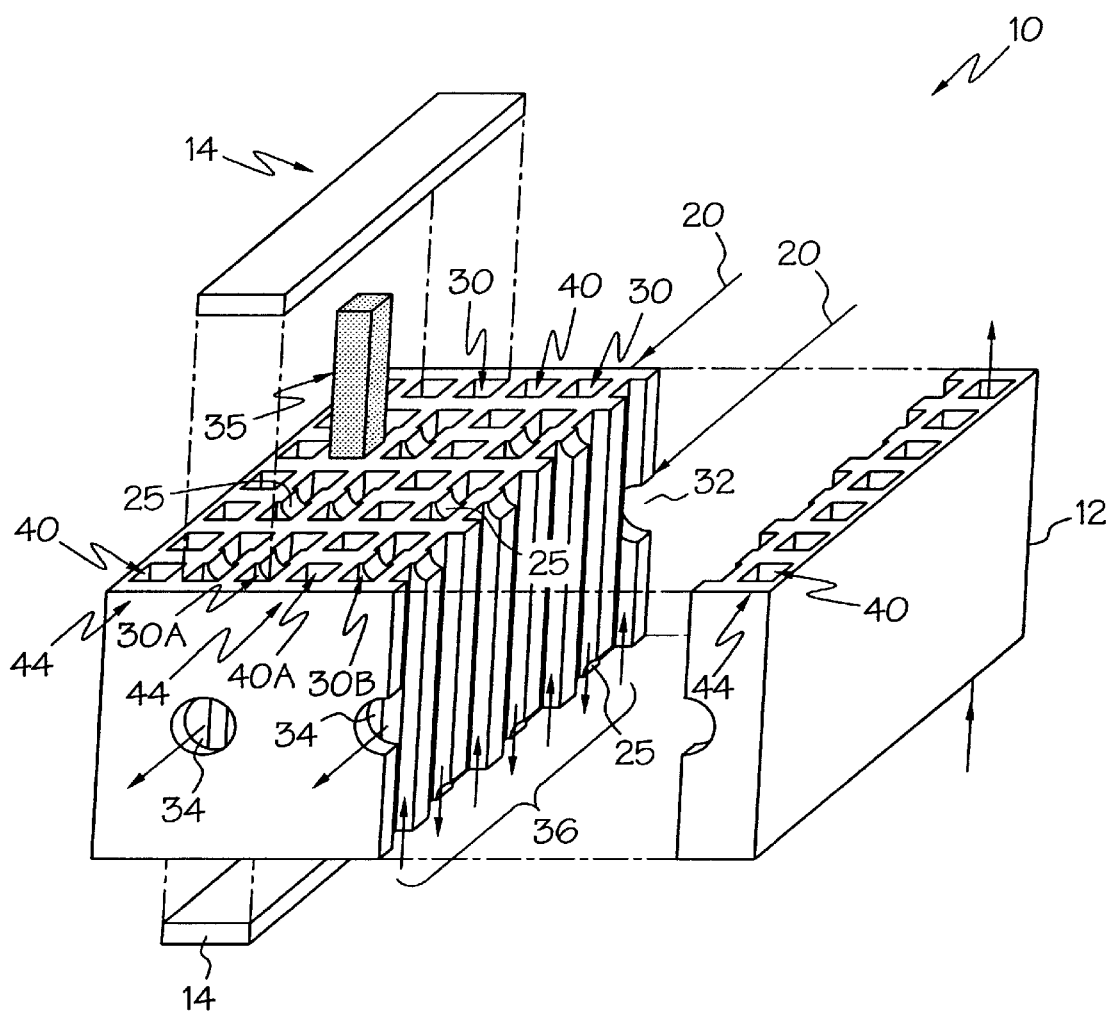
FIGS. 3 and 4 are schematic illustrations of a four stream nitrogen purification device according to the present invention.
Figure 4:
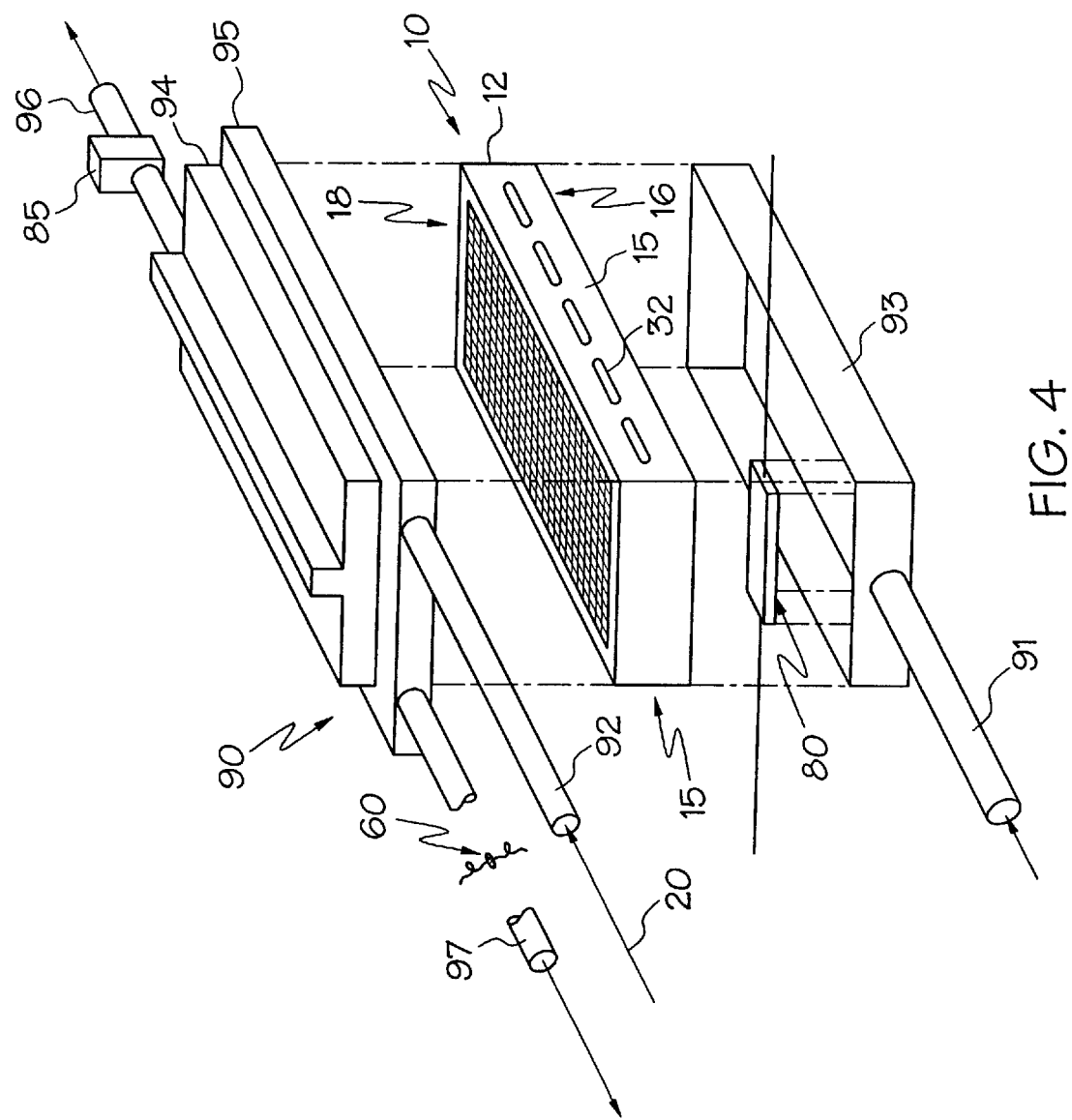

FIGS. 1–4 of the present application illustrate two alternative types of ceramic honeycomb nitrogen purification devices 10 according to the present invention. Specifically, FIGS. 1 and 2 are schematic illustrations of a three stream nitrogen purification device 10 according to the present invention while FIGS. 3 and 4 are schematic illustrations of a four stream nitrogen purification device 10 according to the present invention. The two types of devices share a number of significant structural design characteristics and are differentiated primarily by functions attributable to particular sets of open and closed passages defined by the ceramic body 12 of the device 10.

Specifically, each nitrogen purification device 10 comprises a source gas 20 including a significant amount of gaseous nitrogen. For example, the source gas 20 may comprise air or a commercially available purified nitrogen source with a nitrogen purity level of about 97%. The ceramic body 12 defines a set of gaseous nitrogen passages 30 defining respective source nitrogen input openings 32 and purified nitrogen output openings 34. The ceramic body 12 further defines a set of oxygen disposal passages 40 defining disposed oxygen output openings 44. Preferably, in each embodiment, the two sets of passages are parallel and two gaseous nitrogen passages, e.g., 30A and 30B are exclusively dedicated to individual ones of the oxygen disposal passages, e.g., 40A.

It is noted that the arrangement of the gaseous nitrogen passages 30 and the oxygen disposal passages 40 in the embodiment illustrated in FIGS. 1 and 2 is generally reversed with respect to the arrangement of the gaseous nitrogen passages 30 and the oxygen disposal passages 40 in the embodiment illustrated in FIGS. 3 and 4. Specifically, in the embodiment of FIGS. 1 and 2, the gaseous nitrogen passages 30 are open at the end faces of the ceramic body 12 while the oxygen disposal passages 40 are closed at the end faces of the ceramic body 12. Conversely, in the embodiment of FIGS. 3 and 4, the gaseous nitrogen passages 30 are sealed at the end faces of the ceramic body 12 by an end face sealing plate 14 while the oxygen disposal passages 40 are open at the end faces of the ceramic body 12. Similarly, in the embodiment of FIGS. 1 and 2, the sealed oxygen disposal passages 40 are placed in fluid communication with the set of disposed oxygen output openings or ports 44, while in the embodiment of FIGS. 3 and 4, the gaseous nitrogen passages 30 are sealed and placed in communication with the source nitrogen input openings 32 and purified nitrogen output openings 34. A turbulence inducing insert 35, e.g., a turbulence mesh, is arranged in the gaseous nitrogen passages 30 to improve device efficiency by eliminating laminar flow within the passages 30. A mesh screen 38 is provided as an initial turbulence inducing member in the path of the source gas 20.

Referring specifically to FIG. 3, a selected set of the first and second sets of passages 30, 40 include inter-passage channels 25 formed in the ceramic body 12 between adjacent ones of the selected set of passages. As is clearly illustrated in FIG. 3, the inter-passage channels 25 are formed between the gaseous nitrogen passages 30 and are arranged at or near selected ends of the nitrogen passages 30 so as to define a flow path that extends through the passages 30 and reverses direction following passage through the inter-passage channels 30, as indicated by the set of directional arrows 36.

Figure 5:
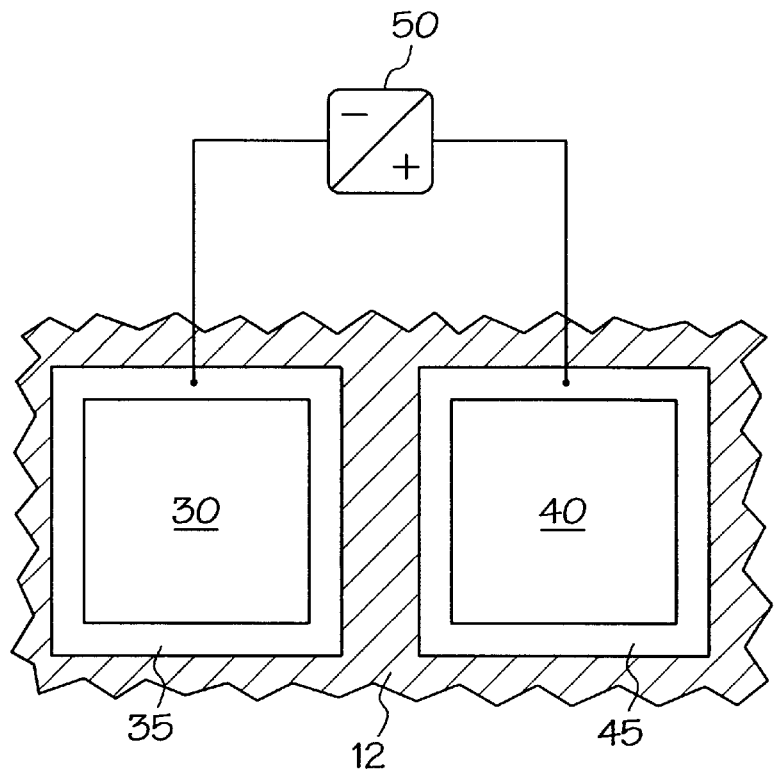
FIG. 5 is a schematic illustration of a portion of a ceramic body according to the present invention.

Referring specifically to the portion of the ceramic body 12 illustrated in FIG. 5, the set of gaseous nitrogen passages 30, one of which is illustrated in FIG. 5, and the set of oxygen disposal passages 40, one of which is illustrated in FIG. 5, include electrode surfaces 35, 45 within the respective passages 30, 40. The electrode surfaces 35, 45 are arranged to form, in combination with the ceramic material of the ceramic body 12, an electroded oxygen conducting ceramic membrane separating respective oxygen disposal passages 40 from corresponding gaseous nitrogen passages 30. An electrical power source 50 is coupled to the electrode surfaces 35, 45 and is arranged such that the electroded surface 45 in the gaseous nitrogen passage 40 comprises a cathode and such that the electroded surface 35 in the oxygen disposal passage 30 comprises an anode.

The electrode surfaces 35, 45, and the electrical connections thereto, are preferably constructed according to the teachings of U.S. Pat. No. 5,972,182, the disclosure of which is incorporated herein by reference. The silver overlay referred to in the '182 patent in the context of an oxygen generator layer may be disposed over the cathode electrodes 45 and may also be disposed over the anode electrodes 35 to reduce the resistivity of these electrodes. A silver paste incorporating a suitable glass composition for forming the silver layer is available from Electroscience Laboratories, Inc. under the product number 9901. In specific embodiments of the present invention, the silver layer may further comprise a glass mixed therein. The glass is selected so as to enhance adhesion of the silver layer to the underlying electrode.

According to specific illustrative embodiments of the present invention, the total volume of the ceramic body 12 is selected to be about 1400 cm$^3$ for the arrangement illustrated in FIGS. 1 and 2, and about 1000 cm$^3$ for arrangement illustrated in FIGS. 3 and 4. The source gas input flow volume is about 25 SCFH (standard cubic feet per hour). The operating temperature is about 600° C. for both device types. It is noted that these embodiments are discussed herein for illustrative purposes only and that preferred embodiments would accommodate much higher volumes and flow rates. Empirically, there is essentially no limit to the purity of the nitrogen that can be achieved with the nitrogen purification device 10 according to the present invention. Further, only a relatively small increase in total power generated by the electrical power source 50 is required to reduce the oxygen to 10 ppm (about 260 W) compared to 3% (about 180 W). The total power increases with increasing nitrogen purity, as indicated by the decreasing oxygen content sensed by the oxygen sensor 60, discussed below. Where the source gas comprises a commercially available purified nitrogen source with a nitrogen purity level of about 97%, as opposed to air, smaller specific powers are involved in purifying nitrogen that is already 97% pure compared to purifying nitrogen from air. The reason is simply that far less oxygen is extracted in the former case.

Figure 6:
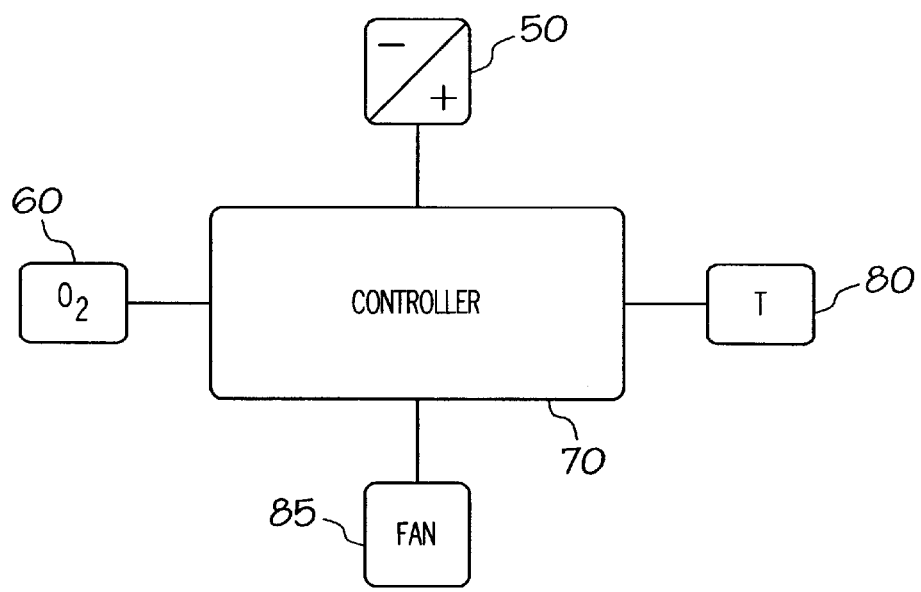
FIG. 6 is a schematic block diagram illustrating the various control components of the present invention.

An oxygen sensor 60, see FIGS. 2, 4 and 6, is placed in fluid communication with the purified nitrogen output openings 34. Typically, the current drawn from the power source 50 is essentially constant for oxygen contents below about 200–1000 ppm, whereas the voltage steadily increases as the oxygen content decreases. This behavior, which holds true outside the illustrated embodiments, demonstrates that for control purposes the current cannot be used for control purposes at low oxygen contents. Rather, the voltage must be used for control purposes at these low oxygen contents. Nitrogen purification control circuitry 70 is arranged to optimize current and voltage generated by the power source 50 by switching from a current control mode to a voltage control mode when the oxygen sensor signal indicates a decrease in oxygen content of gas passing through the purified nitrogen output openings 34 below a predetermined level. Preferably, the predetermined level is established by examining the voltage-current behavior of a specific purification scheme and determining the point at which the current required for progressively lower oxygen levels (higher nitrogen purity levels) becomes constant while the voltage required for the same range of progressively lower oxygen levels increases significantly.

Figure 7:
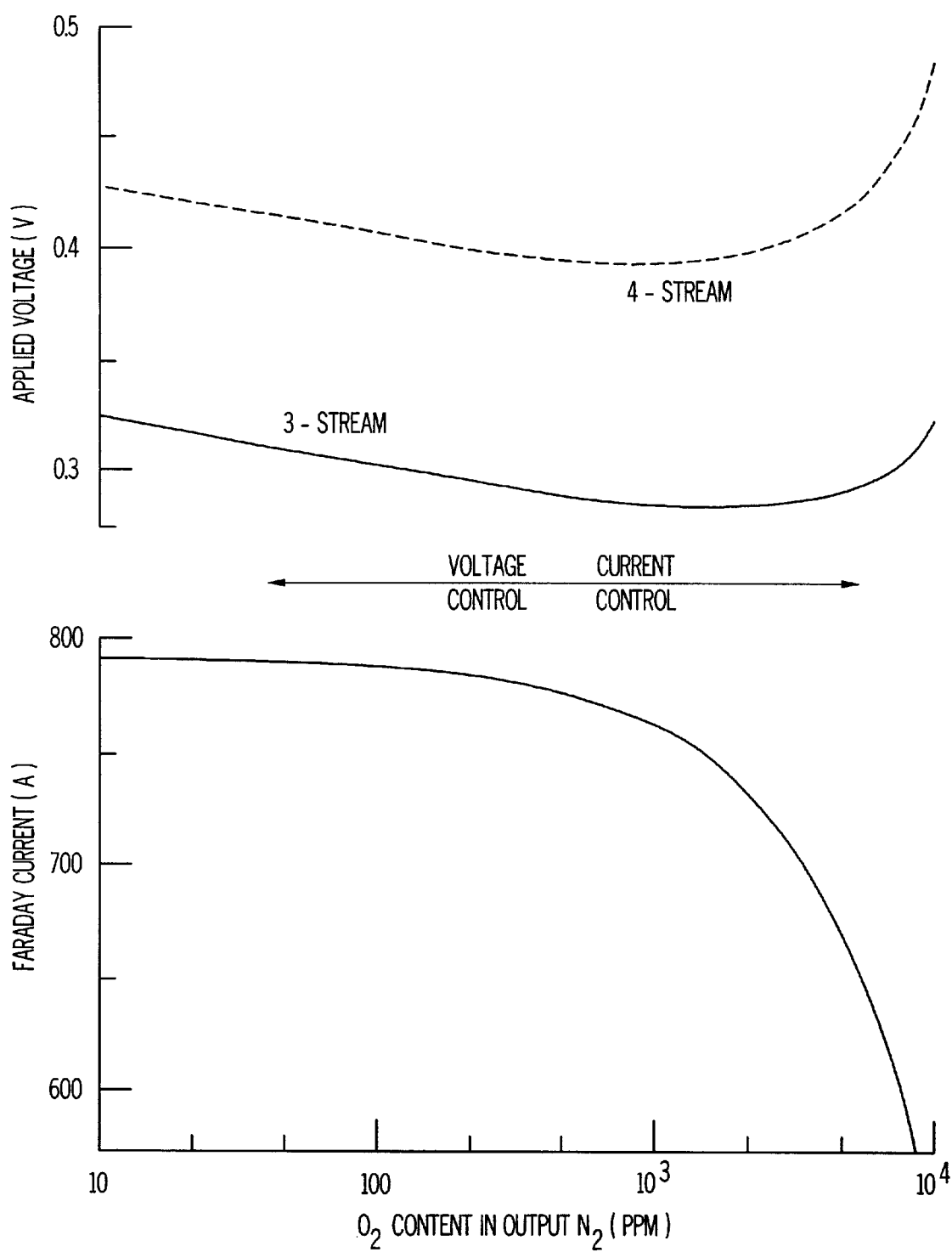
FIG. 7 is a graphical illustration of typical voltage-current behavior for the three and four stream embodiments of a nitrogen purification device according to the present invention.

FIG. 7 illustrates typical voltage-current behavior for the three and four stream embodiments of FIGS. 1–4. The source gas comprises a commercially available purified nitrogen source with a nitrogen purity level of about 97% input at about 190 SCFH through a ceramic body having a total volume of about 2000 cm$^3$. The voltage-current behavior illustrated in FIG. 7 corresponds to a nitrogen purification scheme where the applied voltage goes through a minimum value at about 1000 ppm and increases steadily at lower oxygen contents and where the current value does not change significantly below about 200 ppm. Accordingly, for the illustrated scheme, voltage control would be inappropriate at oxygen content values above about 1000 ppm and current control would be inappropriate for values below about 200 ppm. Thus, the nitrogen purification control circuitry 70 utilized in the illustrated scheme should be arranged to switch from a current control mode to a voltage control mode at an oxygen content value between about 200 ppm and about 1000 ppm, e.g., at about 500 ppm, as is illustrated in FIG. 7.

FIGS. 2 and 4 are exploded schematic three-dimensional views of manifold assemblies 90 for use with the three and four stream nitrogen purification devices 10 of the present invention. Referring initially to FIG. 4, the manifold assembly 90 defines an air supply line 91, a source gas supply line 92, a bottom manifold 93, a top manifold 94, and a side face manifold 95. The bottom manifold 93 is coupled to a first end face 16 of the ceramic body 12 such that the air supply line 91 is in communication with the oxygen disposal passages 40 (not shown in FIG. 4). Similarly, the top manifold 94 is coupled to the opposite end face 18 of the ceramic body 12 such that an exhaust line 96 defined by the top manifold 94 is also in communication with the oxygen disposal passages 40. In this manner, air may pass from the air supply line 91, through the oxygen disposal passages 40, and out the exhaust line 96.

The side face manifold 95 is coupled to opposite port faces 15 of the ceramic body 12. The coupling is such that source gas supply line 92 is placed in communication with the source nitrogen input openings 32 of the ceramic body 12 and such that a purified nitrogen output line 97 is placed in communication with the purified nitrogen output openings 34 of the ceramic body 12. Preferably, the side face manifold 95 and the top manifold 94 comprise a unitary manifold assembly. A heating element 80 is thermally coupled to the ceramic body 12 to provide a source of heat for the ceramic body 12 and to bring the purification device 10 to a suitable operating temperature.

As is illustrated in FIG. 4, the bottom manifold 93 is arranged such that its interior space communicates directly with only the open passages at the first end face 16. Similarly, the top manifold 94 is arranged such that its interior space communicates directly with only the open passages at the second end face 18. Finally, the side face manifold 95 is arranged such that the source gas supply line 92 communicates directly only with the source nitrogen input openings 32 and such that the purified nitrogen output line 97 communicates directly only with the purified nitrogen output openings 34. The opposite ends of the gaseous nitrogen passages 30 may be sealed closed with end face sealing plates 14 formed from a composition characterized by a mixture of glasses available from Vitrifunctions, Inc. of Pittsburgh, Pa., under the product codes 2012 and 572. The particular proportions of each glass component are selected to yield a composition having a coefficient of thermal expansion matching the coefficient of thermal expansion of the ceramic body 12. The bottom manifold 93, the top manifold 94, and the side face manifold 95 are also sealed with the above-described mixture of glasses and may be constructed from a metal alloy, e.g., an Inconel® alloy or an SS-430 stainless steel.

In the embodiment of FIG. 2, the structure of the manifold assembly 90 is similar to that illustrated in FIG. 4, with the particular exceptions specific to the three stream embodiment of the present invention. Specifically, an air supply line 91 is not provided, the source gas supply line 92 is placed in communication with the bottom manifold 93, the purified nitrogen output line 97 is coupled to the top manifold 94, the exhaust line 96 is coupled to the side face manifold 95, and disposed oxygen output openings 44 are provided on the side face 15 of the ceramic body 12. Further, the positioning of the oxygen sensor 60 differs from that illustrated in FIG. 4.

Referring now to FIGS. 4 and 6, the nitrogen purification device 10 further comprises a mass flow regulator 85 coupled to at least one set of the first and second sets of substantially parallel passages. Preferably, as is illustrated in FIG. 4, the mass flow regulator is coupled to the exhaust line 96. The nitrogen purification control circuitry 70 is further arranged to control the mass flow regulator to optimize a mass flow ratio η of gasses moving through the first and second sets of substantially parallel passages 30, 40. Preferably, the mass flow regulator 85 comprises a draft fan and is arranged to establish the mass flow ratio η between about 0.2 and 2.0, where η represents the following ratio:

$$\eta = \frac{R_1}{R_2}$$

where $R_1$ represents a flow rate of a nitrogen source gas in the set of gaseous nitrogen passages and $R_2$ represents a flow rate of disposed oxygen in the oxygen disposal passages.

Preferably, the ceramic body 12 is formed with a stabilized bismuth oxide composition. For example, the oxygen ion conductive ceramic body may be composed of a niobia stabilized bismuth oxide oxygen ion conductive ceramic comprising x mole % $Bi_2O_3$, y mole % $Nb_2O_5$, and z mole % $ZrO_2$. Preferably, x is a value from about 80 to about 90 and y is a value from about 10 to about 20. Alternatively, the oxygen ion conductive ceramic body may be composed of an yttria stabilized bismuth oxide oxygen ion conductive ceramic. Preferably, the yttria stabilized ceramic comprises x mole % $Bi_2O_3$, y mole % $Y_2O_3$, and z mole % $ZrO_2$, where x is a value from about 70 to about 80, y is a value from about 20 to about 30, and z is a value from about 1 to about 5. These ceramic compositions are operational for the purposes of the present invention at temperatures at or below about 650° C.

Having described the invention in detail and by reference to preferred embodiments thereof, it will be apparent that modifications and variations are possible without departing from the scope of the invention defined in the appended claims.

What is claimed is:

1. A nitrogen purification device comprising:

a source gas comprising gaseous nitrogen;

a set of gaseous nitrogen passages defining respective source nitrogen input openings and purified nitrogen output openings;

a set of oxygen disposal passages defining disposed oxygen output openings;

an electroded oxygen conducting ceramic membrane defining a plurality of electrode surfaces disposed in said gaseous nitrogen passages and said oxygen disposal passages, said oxygen disposal passages being separated from respective ones of said set of gaseous nitrogen passages by said electroded oxygen conducting ceramic membrane;

an electrical power source coupled to said electroded oxygen conducting ceramic membrane and arranged such that said electroded surfaces comprise cathodes in said gaseous nitrogen passages and anodes in said oxygen disposal passages; and nitrogen purification control circuitry arranged to optimize current and voltage generated by said power source as a function of nitrogen purity of gas passing through said purified nitrogen output openings.

2. A nitrogen purification device as claimed in claim 1 wherein said nitrogen purification device further comprises an oxygen sensor in fluid communication with said purified nitrogen output openings, and wherein said control circuitry is arranged to optimize current and voltage generated by said power source as a function of a signal generated by said oxygen sensor.

3. A nitrogen purification device as claimed in claim 2 wherein said control circuitry is arranged to optimize current and voltage generated by said power source by switching from a current control mode to a voltage control mode when said oxygen sensor signal indicates a decrease in oxygen content below a predetermined level.

4. A nitrogen purification device as claimed in claim 3 wherein said predetermined level is about 1000 ppm.

5. A nitrogen purification device as claimed in claim 3 wherein said predetermined level is about 200 ppm.

6. A nitrogen purification device as claimed in claim 1 wherein:

said oxygen conducting ceramic membrane comprises a ceramic body defining said set of gaseous nitrogen passages and said set of oxygen disposal passages in the form of first and second sets of substantially parallel passages;

said nitrogen purification device further comprises a mass flow regulator coupled to at least one set of said first and second sets of substantially parallel passages; and said nitrogen purification control circuitry is further arranged to control said mass flow regulator to optimize a mass flow ratio η of gasses moving through said first and second sets of substantially parallel passages.

7. A nitrogen purification device as claimed in claim 6 wherein said mass flow regulator is arranged to establish said mass flow ratio η between about 0.2 and 2.0, where $$\eta = \frac{R_1}{R_2}$$

where $R_1$ represents a flow rate of a nitrogen source gas in said set of gaseous nitrogen passages and $R_2$ represents a flow rate of disposed oxygen in said oxygen disposal passages.

8. A nitrogen purification device as claimed in claim 6 wherein said mass flow regulator comprises a draft fan coupled to said set of oxygen disposal passages.

9. A nitrogen purification device as claimed in claim 1 further comprising turbulence inducing inserts arranged in said set of gaseous nitrogen passages.

10. A nitrogen purification device as claimed in claim 1 wherein said source gas comprises air.

11. A nitrogen purification device as claimed in claim 1 wherein said source gas comprises a gas with a nitrogen purity level of about 97%.

12. A nitrogen purification device as claimed in claim 1 wherein a plurality of gaseous nitrogen passages are exclusively dedicated to individual ones of said oxygen disposal passages.

13. A nitrogen purification device as claimed in claim 1 wherein said oxygen conducting ceramic membrane comprises a honeycomb ceramic structure.

14. A nitrogen purification device as claimed in claim 1 wherein said oxygen conducting ceramic membrane comprises a ceramic body defining said set of gaseous nitrogen passages and said set of oxygen disposal passages in the form of first and second sets of substantially parallel passages.

15. A nitrogen purification device as claimed in claim 14 wherein:
  a selected set of said first and second sets of passages include inter-passage channels formed in said ceramic body between adjacent ones of said selected set of passages;
  said inter-passage channels are arranged proximate selected ones of said opposite passage ends;
  said selected set of passages and said inter-passage channels are arranged to define a flow path extending through said selected set of passages; and
  said flow path reverses direction following passage through said inter-passage channels.

16. A nitrogen purification device as claimed in claim 1 wherein:
  each of said passages defines opposite passage ends;
  said opposite ends of said gaseous nitrogen passages are open;
  said opposite ends of said oxygen disposal passages are closed; and
  said oxygen disposal passages include inter-passage channels formed in said ceramic body between adjacent ones of said oxygen disposal passages.

17. A nitrogen purification device as claimed in claim 16 wherein said source nitrogen input openings are coupled to a source of air.

18. A nitrogen purification device as claimed in claim 16 wherein said source nitrogen input openings are coupled to a source of gas with a nitrogen purity level of about 97%.

19. A nitrogen purification device as claimed in claim 16 wherein said nitrogen purification device further comprises at least one disposed oxygen output port coupled to said oxygen disposal passages.

20. A nitrogen purification device as claimed in claim 1 wherein:
  each of said passages defines opposite passage ends;
  said opposite ends of said oxygen disposal passages are open;
  said opposite ends of said gaseous nitrogen passages are closed; and
  said gaseous nitrogen passages include inter-passage channels formed in said ceramic body between adjacent ones of said gaseous nitrogen passages.

21. A nitrogen purification device as claimed in claim 1 wherein:
  said oxygen conducting ceramic membrane comprises a ceramic body defining said set of gaseous nitrogen passages and said set of oxygen disposal passages in the form of first and second sets of substantially parallel passages;
  each of said passages defines opposite passage ends;
  said opposite ends of a selected set of said passages are open;
  said opposite ends of a remaining set of said passages are closed;
  said set of closed passages include inter-passage channels formed in said ceramic body between adjacent ones of said closed passages;
  said nitrogen purification device further comprises at least one closed passage input port coupled to said closed set of passages and at least one closed passage output port coupled to said set of closed passages;
  said closed passage input port, said closed passages, and said closed passage output port collectively define a closed passage flow path extending from said closed passage input port to said closed passage output port.

22. A nitrogen purification device as claimed in claim 21 wherein said flow path reverses direction following passage through said inter-passage channels.

23. A nitrogen purification device as claimed in claim 21 wherein said closed passage input port is coupled to a source of gaseous nitrogen, said open passages are coupled to a source of air, and said nitrogen purification device is arranged such that said closed passage output port passes purified nitrogen.

24. A nitrogen purification device as claimed in claim 23 wherein said nitrogen purification device further comprises a draft fan coupled to said open passages.

25. A nitrogen purification device as claimed in claim 21 wherein said closed passage input port is coupled to a source of air, said open passages are coupled to a source of gaseous nitrogen, and said nitrogen purification device is arranged such that said closed passage output port passes oxygen enriched air.

26. A nitrogen purification device as claimed in claim 25 wherein said nitrogen purification device further comprises a draft fan coupled to said closed passage output port.

27. A nitrogen purification device comprising:

a source gas comprising gaseous nitrogen;

a set of gaseous nitrogen passages defining respective source nitrogen input openings and purified nitrogen output openings;

a set of oxygen disposal passages defining disposed oxygen output openings, wherein a plurality of said gaseous nitrogen passages are exclusively dedicated to individual ones of said oxygen disposal passages;

an electroded oxygen conducting ceramic membrane comprising a ceramic body defining said set of gaseous nitrogen passages and said set of oxygen disposal passages in the form of first and second sets of substantially parallel passages and including a plurality of electrode surfaces disposed in said gaseous nitrogen passages and said oxygen disposal passages, said oxygen disposal passages being separated from respective ones of said set of gaseous nitrogen passages by said electroded surfaces of said oxygen conducting ceramic membrane;

an electrical power source coupled to said electroded oxygen conducting ceramic membrane and arranged such that said electroded surfaces comprise cathodes in said gaseous nitrogen passages and anodes in said oxygen disposal passages;

an oxygen sensor in fluid communication with said purified nitrogen output openings; and nitrogen purification control circuitry arranged to optimize current and voltage generated by said power source by switching from a current control mode to a voltage control mode when said oxygen sensor signal indicates a decrease in oxygen content of gas passing through said purified nitrogen output openings below a predetermined level.

* * * * *